United States Patent [19]

Pearson et al.

[11] Patent Number: 5,764,558
[45] Date of Patent: Jun. 9, 1998

[54] METHOD AND SYSTEM FOR EFFICIENTLY MULTIPLYING SIGNED AND UNSIGNED VARIABLE WIDTH OPERANDS

[75] Inventors: William C. Pearson, South Burlington; Clarence R. Ogilvie, Huntingon, both of Vt.

[73] Assignee: International Business Machines Corporation, Armonk, N.Y.

[21] Appl. No.: 520,151

[22] Filed: Aug. 25, 1995

[51] Int. Cl.$^6$ .................................................. G06F 7/52
[52] U.S. Cl. .................................................. 364/757; 364/758
[58] Field of Search .................................. 364/754, 757, 364/758, 759

[56] References Cited

U.S. PATENT DOCUMENTS

| | | | |
|---|---|---|---|
| 3,914,589 | 10/1975 | Gaskill, Jr. et al. | 364/758 |
| 3,947,670 | 3/1976 | Irwin et al. | 364/758 |
| 3,956,622 | 5/1976 | Lyon | 364/758 |
| 4,293,921 | 10/1981 | Smith, Jr. | 364/726 |
| 4,538,239 | 8/1985 | Magar | 364/759 |
| 4,577,282 | 3/1986 | Caudel et al. | 364/200 |
| 4,665,500 | 5/1987 | Poland | 364/760 |
| 4,706,210 | 11/1987 | Snelling et al. | 364/758 |
| 4,768,161 | 8/1988 | Bechade et al. | 364/758 |
| 4,802,110 | 1/1989 | Richards et al. | 364/724.05 |
| 4,811,269 | 3/1989 | Hirose et al. | 364/754 |
| 4,858,164 | 8/1989 | Schildhorn | 364/736 |
| 4,953,119 | 8/1990 | Wong et al. | 364/754 |
| 5,163,017 | 11/1992 | Wong et al. | 364/726 |
| 5,187,795 | 2/1993 | Balmforth et al. | 395/800 |
| 5,226,003 | 7/1993 | Nagamatsu | 364/760 |
| 5,251,167 | 10/1993 | Simmonds et al. | 364/760 |
| 5,343,416 | 8/1994 | Eisig et al. | 364/757 |
| 5,442,799 | 8/1995 | Murakami et al. | 395/800 |
| 5,473,558 | 12/1995 | Nakamura | 364/750.5 |
| 5,579,253 | 11/1996 | Lee et al. | 364/757 |

OTHER PUBLICATIONS

Flores, Ivan; The Logic of Computer Arithmetic; Prentice-Hall; pp. 52 and 53, copright 1963 month unknown.

*Primary Examiner*—Reba I. Elmore
*Assistant Examiner*—Robert J. Dolan
*Attorney, Agent, or Firm*—Richard M. Kotulak; Andrew J. Dillon

[57] ABSTRACT

A plurality of multipliers for multiplying numbers having B number of bits are provided for multiplying A-operands having B number of bits by a B-operand having B number of bits. Pairs of A- and B-operands are loaded into each multiplier. Each of the multipliers calculates an intermediate result by internally adding B number of partial products. In response to the data processing system being operated in a signed mode, selected bits in selected partial products in selected multipliers are complemented, and $2^B$ is added to a selected intermediate result so that when the intermediate results are appropriately weighted and added together, a result that is the product of two operands having 2B-bits may be calculated. In another mode, multiple products having B-bits are calculated from the pairs of A- and B-operands. The A- and B-operands may be either signed or unsigned.

10 Claims, 3 Drawing Sheets

METHOD AND SYSTEM FOR EFFICIENTLY MULTIPLYING SIGNED AND UNSIGNED VARIABLE WIDTH OPERANDS

BACKGROUND OF THE INVENTION

1. Field of the Invention

The present invention relates in general to an improved data processing system, and in particular to a method and system for efficiently multiplying signed magnitude numbers or two's complement numbers. Still more particularly, the present invention relates to a method and system for calculating multiple independent products of signed or unsigned pairs of operands, having a smaller number of bits, or calculating a single product of a signed or unsigned pair of operands having a larger number of bits in response to receiving a particular instruction.

2. Description of the Related Art

As multi-media and other signal processing computer applications become more popular, central processing unit (CPU) designers have been challenged to design faster and more efficient arithmetic logic units (also referred to as data processing systems) for performing the vast number of calculations required by such applications. For example, multi-media and signal processing algorithms typically perform mathematical operations such as Fast Fourier Transforms (FFTs) and Inverse Fourier Transforms (IFTs), Butterflies, Discrete Cosign Transforms (DCTs) and Inverse Discrete Cosign Transforms (IDCTs), and calculations to perform standard JPEG (Joint Photographic Experts Group) and MPEG (Motion Picture Experts Group) algorithm calculations.

In addition to performing calculations quickly, additional efficiency may be gained by performing multiple parallel operations having smaller operands (fewer bits) utilizing portions of the data processing system, or alternatively, performing a single data processing system operation utilizing a greater number of resources within the data processing system, if not all of the data processing system, to operate on larger operands, when a demand for processing larger numbers arises. Furthermore, data processing efficiency may be increased by performing sequential data processing operations (e.g., multiply then add) in response to a single instruction, and by providing access to intermediate results during complex sequential calculations.

In view of the above, it would be desirable to have a method and system in a data processing system that multiplies operands quickly, wherein such method and system is flexible enough to handle signed or unsigned operands that are either large or small.

SUMMARY OF THE INVENTION

It is therefore one object of the present invention to provide an improved data processing system.

It is another object of the present invention to provide a method and system for efficiently multiplying signed magnitude numbers or two's complement numbers.

It is yet another object of the present invention to provide a method and system for calculating multiple independent products of signed or unsigned pairs of operands, having a smaller number of bits, or calculating a single product of a signed or unsigned pair of operands having a larger number of bits, in response to receiving a particular instruction.

The foregoing objects are achieved as is now described. A plurality of multipliers for multiplying numbers having B number of bits are provided for multiplying A-operands having B number of bits by a B-operand having B number of bits. Pairs of A- and B-operands are loaded into each multiplier. Each of the multipliers calculates an intermediate result by internally adding B number of partial products. In response to the data processing system being operated in a signed mode, selected bits in selected partial products in selected multipliers are complemented, and $2^B$ is added to a selected intermediate result so that when the intermediate results are appropriately weighted and added together, a result that is the product of two operands having 2B-bits may be calculated. In another mode, multiple products having B-bits are calculated from the pairs of A- and B-operands. The A- and B-operands may be either signed or unsigned.

The above, as well as additional objects, features, and advantages of the present invention, will become apparent in the following detailed written description.

DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
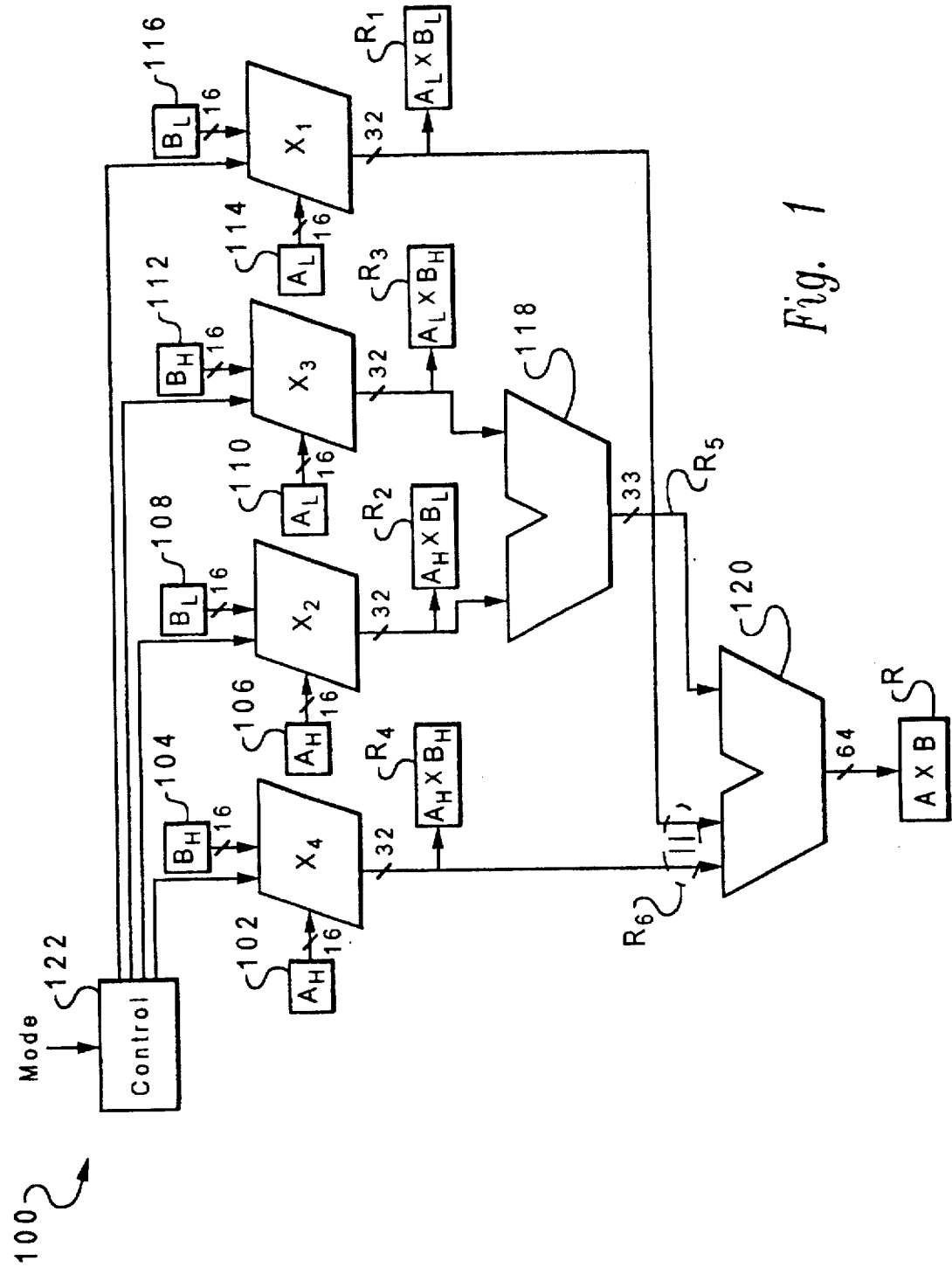
FIG. 1 is a high-level block diagram of a data processing system architecture in accordance with the present invention.

With reference now to the figures, and in particular with reference to FIG. 1, there is depicted a data processing system for efficiently multiplying a plurality of operands in accordance with the method and system of the present invention. As illustrated, data processing system 100 includes multipliers $X_1$, $X_2$, $X_3$, and $X_4$, which each receive two input operands 102–116. In the example illustrated, each input operand includes 16 bits. Those persons skilled in the art should recognize that input operands 102–116 may include less than 16 bits or more than 16 bits, as dictated by design preference.

Multipliers $X_1$–$X_4$ each calculate intermediate results $R_1$–$R_4$, respectively, that are the products of the two input operands 102–116, respectively, that are input into multipliers $X_1$–$X_4$. In the example illustrated in FIG. 1, intermediate results $R_1$–$R_4$ each include 32 bits, which is the number of bits required to represent the result of multiplying two 16-bit operands.

Outputs of multiplier $X_2$ and multiplier $X_3$ are each coupled to inputs of adder 118. The two inputs to adder 118 are each 32 bits wide. The output of adder 118 is 33 bits wide, and is coupled to a first input of adder 120. The second input of adder 120 receives a 64-bit data word that is formed by concatenating the 32-bit output of multiplier $X_4$ with the 32-bit output of multiplier $X_1$. Adder 120 outputs a 64-bit result R.

Adder 118 is a conventional adder that adds two 32-bit numbers to produce a 33-bit result. Adder 120, however, adds a 33-bit number to a 64-bit number to produce a 64-bit result. Moreover, the 33-bit input to adder 120 is a "weighted" number that is added to the 64-bit number. That is, $R_5$ has been shifted to the left by 16 bits—the equivalent of multiplying $R_5$ by $2^{16}$. Thus, in a weighted number, the least significant bit may not represent a value of $2^0$. In the example shown in FIG. 1, the least significant bit of $R_5$ has a place value of $2^{16}$.

To use data processing system 100 to multiply two 32-bit numbers to produce a 64-bit result, input operands 102–116 are set as indicated in FIG. 1: input operand 102 is equal to the highest 16 bits of a 32-bit A-operand, input operand 104 is equal to the highest 16 bits of a 32-bit B-operand, input operand 106 is equal to the highest 16 bits of the A-operand, input operand 108 is equal to the lowest 16 bits of the B-operand, input operand 110 is equal to the lowest 16 bits of the A-operand, input operand 112 is equal to the highest 16 bits of the B-operand, input operand 114 is equal to the lowest 16 bits of the A-operand, and input operand 116 is equal to the lowest 16 bits of the B-operand. Therefore, input operand 102 equals input operand 106, input operand 110 equals input operand 114, input operand 108 equals input operand 116, and input operand 104 equals input operand 112.

When input operands 102–116 are set to the special case described above, intermediate results $R_1$–$R_4$ are calculated in multipliers $X_1$–$X_4$ as illustrated. To finish the 32-by-32-bit multiply, adder 118 adds $R_2$ and $R_3$ to produce $R_5$, and adder 120 adds a weighted $R_5$ to $R_6$ (i.e., the concatenation of $R_4$ and $R_1$) to produce 64-bit result R.

When data processing system 100 is not being used to perform a 32-by-32 multiplication, data processing system 100 may produce 4 independent 32-bit products, such as $R_1$–$R_4$, when 8 independent 16-bit operands 102–116 are loaded into multipliers $X_1$–$X_4$. Thus, in one mode of operation, data processing system 100 produces a 64-bit product of two 32-bit operands, and in another mode of operation, data processing system 100 produces four 32-bit products from 8 independent input operands 102–116.

Within data processing system 100, control circuit 122 is coupled to multipliers $X_1$–$X_4$, and controls the mode of operation of data processing system 100. In a first mode of operation, data processing system 100 loads 8 independent 16-bit unsigned operands 102–116 and calculates unsigned 4 products in parallel, as illustrated at $R_1$–$R_4$. In a second mode of operation, 8 independent 16-bit signed operands 102–116 are loaded into multipliers $X_1$–$X_4$ to calculate 4 signed products $R_1$–$R_4$ in parallel. In a third mode of operation, the highest 16 bits of a 32-bit unsigned A-operand are loaded into input operand 102 and input operand 106, the lowest 16 bits of the 32-bit unsigned A-operand are loaded into input operands 110 and 114, the highest 16 bits of a 32-bit unsigned B-operand are loaded into input operands 104 and 112, and the lowest 16 bits of a 32-bit unsigned B-operand are loaded into input operands 108 and 116 so that multipliers $X_1$–$X_4$ and adders 118 and 120 can calculate a 64-bit unsigned product. And finally, in a fourth mode of operation, the highest 16 bits of a 32-bit signed A-operand are loaded into input operand 102 and input operand 106, the lowest 16 bits of the 32-bit signed A-operand are loaded into input operands 110 and 114, the highest 16 bits of a 32-bit signed B-operand are loaded into input operands 104 and 112, and the lowest 16 bits of a 32-bit signed B-operand are loaded into input operands 108 and 116 so that multipliers $X_1$–$X_4$ and adders 118 and 120 can calculate a 64-bit signed product. As discussed below with reference to FIGS. 4 and 5, control circuit 122 causes manipulation of selected bits in selected partial products in multipliers $X_1$–$X_4$ when data processing system 100 is operated in a signed mode.

Figure 2:
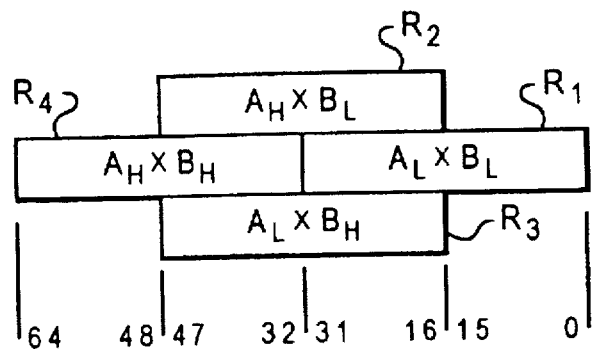
FIG. 2 illustrates, in block diagram form, the relative weights of bits in intermediate results calculated by the data processing system illustrated in FIG. 1.

With reference now to FIG. 2, there is depicted a block diagram of the relative weights of intermediate results $R_1$–$R_4$ that illustrates how intermediate results $R_1$–$R_4$ are added together to produce the 64-bit result R. As illustrated, $R_2$ and $R_3$ are added together with bit n of $R_2$ added to bit n of $R_3$. $R_1$ includes bits representing values of $2^0$ to $2^{31}$. $R_4$ includes bits representing values of $2^{32}$ to $2^{64}$. Both $R_2$ and $R_3$ include bits representing values of $2^{16}$ to $2^{47}$.

Figure 3:
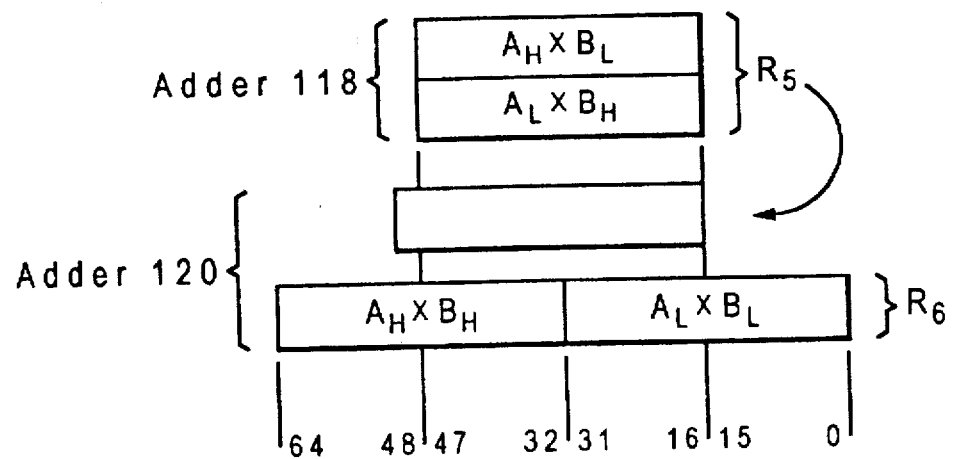
FIG. 3 depicts, in block diagram form, the weighted addition performed by data processing system shown in FIG. 1 in accordance with the method and system of the present invention.

With reference now to FIG. 3, there is depicted the relative weights of intermediate results $R_1$–$R_4$. As illustrated, $R_2$ and $R_3$ are added together in adder 118 (see FIG. 1) to produce $R_5$, a 33-bit number. $R_4$ and $R_1$ are concatenated to form $R_6$, a 64-bit number. In adder 120 (see FIG. 2), $R_5$ is shifted 16 bits to the left (i.e., multiplied by $2^{16}$) and added to $R_6$.

Figure 4:
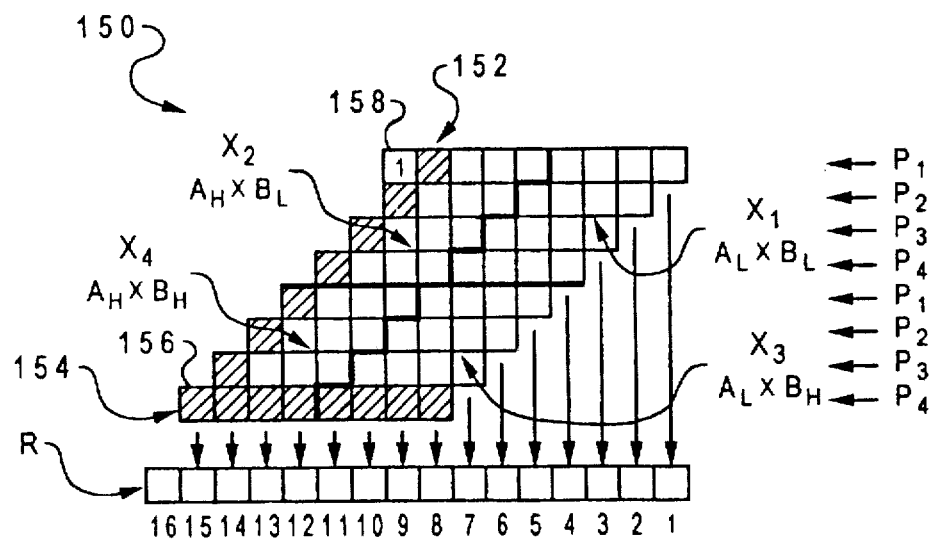
FIG. 4 illustrates the summation and manipulation of data bits in partial products produced by the data processing system of FIG. 1 in accordance with the method and system of the present invention when operated in a large, signed data word mode.

With reference now to FIG. 4, there is depicted partial products $P_1$–$P_4$ that are calculated and added in multipliers $X_1$–$X_4$, where multipliers $X_1$–$X_4$ are 4-bit multipliers. For ease of illustration, FIG. 4 has been illustrated with input operands 102–116 being 4 bits wide, rather than 16 bits wide as illustrated in FIGS. 1–3.

As illustrated in FIG. 4, each multiplier $X_1$–$X_4$ produces 4 partial products $P_1$–$P_4$. Partial products for each of multipliers $X_1$–$X_4$ are separated by the bold lines running through partial product matrix 150. Result R is produced by adding bits in the bit columns of partial product matrix 150. As can be seen, partial products $P_1$–$P_4$ in multiplier $X_2$ are added to a partial product $P_1$–$P_4$ with a corresponding weight in multiplier $X_3$ between bit columns 5 and 11. Partial products in multiplier $X_1$ are included in the summation of bit columns 1–7 and partial products in multiplier $X_4$ are included in the summation of bit columns 9–15, with bit 16 receiving a carry-out from bit column 15.

According to an important aspect of the present invention, when data processing system 100 is being operated in the signed mode, selected bits in partial product matrix 150 must be complemented before being added to produce intermediate results $R_1$–$R_4$, which may be ultimately added to produce result R. When data processing system 100 is set in a signed mode for multiplying two 8-bit operands (as shown in FIG. 4), the most significant bits in partial products $P_1$–$P_4$ of both multiplier $X_2$ and $X_4$ are complemented, as shown by the cross-hatching in bit locations along diagonal 152 in partial product matrix 150. In a similar manner, partial products $P_4$ in both multiplier $X_4$ and $X_3$ are complemented, as illustrated by the crosshatching in row 154. Note that bit 156 has been complemented twice according to the "complementing" steps described above. Because bit 156 is complemented twice, bit 156 need not be complemented at all.

In addition to complementing selected bits as shown in FIG. 4, a "1" is added to bit column 158, as shown at reference numeral 158. By performing the complementing steps and adding a "1" to a selected bit column as described in relation to FIG. 4, two 8-bit signed operands may be multiplied, producing partial product matrix 150, which is formed from partial products $P_1$–$P_4$ in multipliers $X_1$–$X_4$, respectively. To produce result R, the columns in partial product matrix 150 are added, as illustrated.

Figure 5:
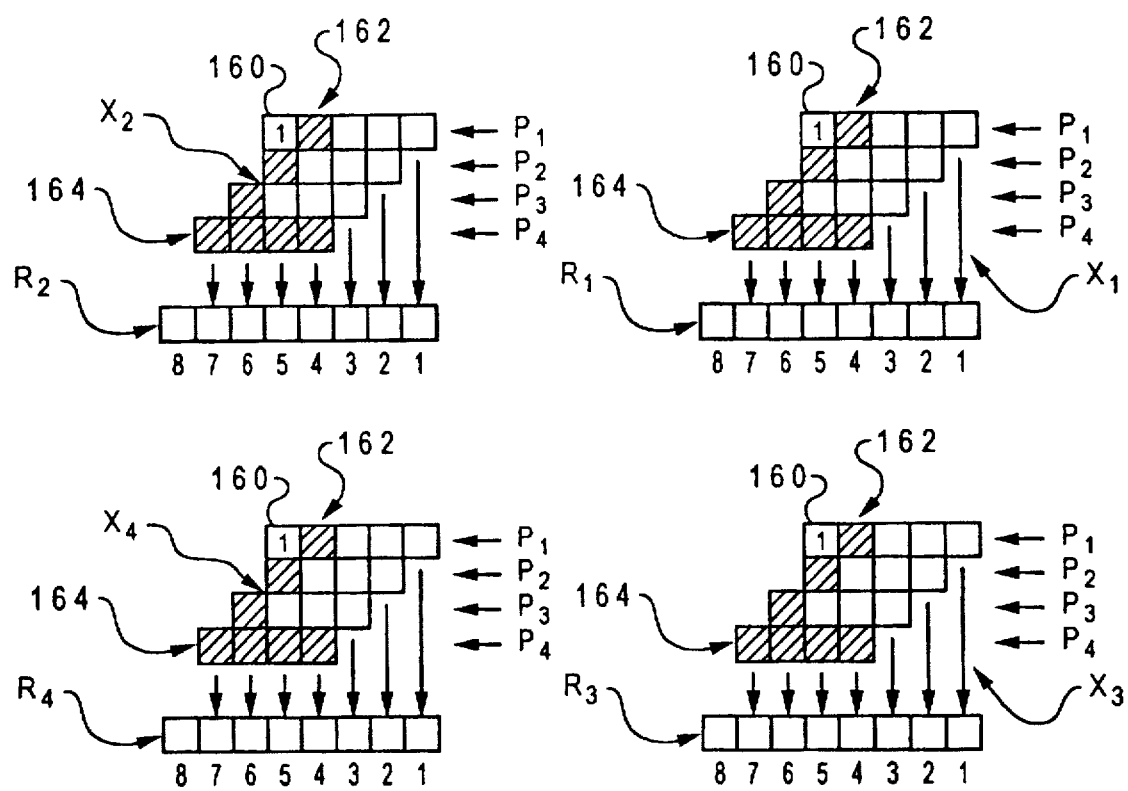
FIG. 5 illustrates the summation and manipulation of data bits in partial products produced by the data processing system of FIG. 1 in accordance with the method and system of the present invention when operated in a small, signed data word mode.

With reference now to FIG. 5, there is depicted the independent operation of multipliers $X_1$–$X_4$ to produce a plurality of products $R_1$–$R_4$ in accordance with the method and system of the present invention. When multipliers $X_1$–$X_4$ are operated independently to produce 4 independent results $R_1$–$R_4$, input operands 102–116 contain values that are completely independent of one another, which may be loaded from 8 independent registers. If data processing system 100 is set in a mode to perform 4 multiplications utilizing unsigned operands, none of the bits in partial products $P_1$–$P_4$ are complemented, and the cross-hatching of bit locations in FIG. 5 may be ignored. Similarly, bit 160 may be ignored when multiplying unsigned operands.

In a signed mode of operation for producing 4 signed products $R_1$–$R_4$, the most significant bits of partial products $P_1$–$P_4$ are complemented, as shown by the cross-hatching in diagonals 162. Similarly, partial products $P_4$ in each multiplier $X_1$–$X_4$ are complemented as shown by the cross-hatching in rows 164. When operated in the signed mode, bit 160 is added to bit column 5 in each multiplier $X_1$–$X_4$.

Whether data processing system 100 operates in a mode to produce a single large product as shown in FIG. 4 or in a mode to produce 4 smaller products as shown in FIG. 5, and whether data processing system 100 operates with signed operands or unsigned operands, is determined by control circuit 122 in response to receiving a particular op-code or instruction.

In one embodiment of the present invention, data processing system 100 is utilized to perform the operations shown below in Table 1.

TABLE 1

| Function # | | |
|---|---|---|
| Dual Signed Integer 16 × 16-bit Multiplies, Products Scaled by ½: | | |
| 0 | V←([$X_h$VIMM$_{15:0}$] × $Y_h$) ÷ 2 | W←([$X_j$VIMM$_{15:0}$] × $Y_l$) ÷ 2 |
| 1 | V←([$X_j$VIMM$_{15:0}$] × $Y_h$) ÷ 2 | W←([$X_h$VIMM$_{15:0}$] × $Y_l$) ÷ 2 |
| 2 | V←([$X_h$VIMM$_{15:0}$] × $Y_l$) ÷ 2 | W←([$X_j$VIMM$_{15:0}$] × $Y_l$) ÷ 2 |
| Quad Signed Integer 16 × 16-bit Multiplies with Dual Add/Subtract, sum of Dual Products Scaled by ¼: | | |
| 3 | V←($X_h$ × $Y_h$ − $X_l$ × $Y_l$) ÷ 4 | W←($X_l$ × $Y_h$ + $X_h$ × $Y_l$) ÷ 4 |
| 4 | V←($X_h$ × $Y_h$ − $X_l$ × $Y_l$) ÷ 4 | W←($T_l$ × $Y_h$ + $X_h$ × $Y_l$) ÷ 4 |
| 5 | V←($X_h$ × $Y_h$ − $X_l$ × $Y_l$) ÷ 4 | W←($T_h$ × $Y_h$ + $T_l$ × $Y_l$) ÷ 4 |
| 6 | V←($X_l$ × $Y_l$ − $X_h$ × $Y_h$) ÷ 4 | W←($T_h$ × $Y_h$ + $T_l$ × $Y_l$) ÷ 4 |
| 7 | V←($X_h$ × $Y_h$ − $X_l$ × $Y_l$) ÷ 4 | W←($T_h$ × $Y_h$ + $T_l$ × $Y_l$) ÷ 4 |
| Quad Signed Integer 16-bit Addition/Subtraction: | | |
| 8 | $V_h$←$X_h$ + $Y_l$  $V_l$←$X_l$ − $Y_h$ | $W_h$←$X_j$ + $Y_h$  $W_l$←$X_h$ − $Y_l$ |
| 9 | $V_h$←$X_h$ + $Y_h$  $V_l$←$X_l$ = $Y_l$ | $W_h$←$X_h$ + $T_h$  $W_l$←$X_l$ = $T_l$ |
| 10 | $V_h$←$X_h$ + $Y_h$  $V_l$←$X_l$ = $Y_l$ | $W_h$←$X_h$ + $T_h$  $W_l$←$X_l$ − $T_l$ |
| Signed Integer 32 × 32-bit Multiply, Product Scaled by ½: | | |
| 11 | V‖W←([XVIMM$_{15:0}$‖16b'0'] × Y) ÷ 2 | |
| 12 | V‖W←[XV16b'IMM$_{15}$·‖IMM$_{15:0}$] × Y | |
| Unsigned Integer 32 × 32-bit Multiply Producing one (1) 64-bit Unsigned Integer Product | | |
| 13 | V‖W←[XVIMM$_{15:0}$‖16b'0'] $x_h$ Y | |
| IEEE Floating Point Single Precision Multiply | | |
| 14 | Z←X $x_{fp}$ Y + round(mode) | |

Note: The following symbols/conventions are used in this table:

TABLE 1-continued

| Function # | |
|---|---|
| Symbol | Meaning |
| V | One value or the other is used in the operation. This is NOT a bitwise-OR of the two values. |
| h | The most significant half of a word input, corresponding to bit numbers 31 through 16. |
| l | The least significant half of a word input, corresponding to bit numbers 15 through 0. |
| IMM | An immediate field contained in the instruction. |
| $X_{fp}$ | A Floating Point Multiplication. |

While the present invention has been illustrated with an array of four multipliers $X_1$–$X_4$, the present invention may be implemented with an array of M by N multipliers, where M and N are greater than 4. Whatever size of multiplier array is selected, partial products and intermediate results must be added together with appropriate weighting. With larger multiplier arrays, additional adders are required to add intermediate results according to the principles illustrated above.

In yet another embodiment, each multiplier $X_1$–$X_4$ may be implemented with a separate data processing system 100, each having an array of multipliers according to FIG. 1. Thus, arrays of multipliers may be nested within another array of multipliers.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a data processing system for efficiently multiplying operands, wherein said data processing system includes an array of 4 B-bit multipliers, wherein said multipliers in a top row of said array are referenced as $X_1$ and $X_2$ from the right, and said multipliers in a bottom row of said array are referenced as $X_3$ and $X_4$ from the right, said method comprising the steps of:

loading one of a plurality of A-operands, $A_1$ through $A_4$, into each of said multipliers, $X_1$ through $X_4$, respectively, in said array of 4 B-bit multipliers, wherein each of said operands $A_1$ through $A_4$ includes B number of bits;

loading one of a plurality of B-operands, $B_1$ through $B_4$, into each of said multipliers, $X_1$ through $X_4$, respectively, in said array of 4 B-bit multipliers, wherein each of said operands $B_1$ through $B_4$ includes B number of bits;

calculating a plurality of intermediate results, $R_1$ through $R_4$, wherein each of said intermediate results $R_1$ through $R_4$ is 2B bits in length and is equal to the product of said A-operand and said B-operand loaded into said multipliers $X_1$ through $X_4$;

outputting from said array of multipliers each of said intermediate results $R_1$ through $R_4$;

adding intermediate result $R_2$ and $R_3$ to produce $R_5$ which is 2B+1 bits in length;

concatenating intermediate result $R_4$ and $R_1$ to produce $R_6$ which is 4B bits in length; and multiplying $R_5$ by $2^B$ and adding $R_6$ to produce a final result. R which is 4B bits in length.

2. The method in a data processing system for efficiently multiplying operands according to claim 1 wherein $A_1$ and $A_3$ are equal to the least significant half of a 2B-bit data word A. $A_2$ and $A_4$ are equal to the most significant half of said 2B-bit data word A. $B_1$ and $B_2$ are equal to the least significant half of a 2B-bit data word B. $B_3$ and $B_4$ are equal to the most significant half of said 2B-bit data word B. and wherein said step of multiplying $R_5$ by $2^B$ and adding $R_6$ to produce a final result. R. includes multiplying $R_5$ by $2^B$ and adding $R_6$ to produce a final result. R. wherein R is equal to the product of said 2B-bit data word A and said 2B-bit data word B.

3. The method in a data processing system for efficiently multiplying operands according to claim 1 wherein said step of multiplying $R_5$ by $2^B$ and adding $R_6$ to produce a final result. R. includes adding the (n)th bit of $R_5$ to the (n+B)th bit of $R_6$ to produce a final result. R.

4. The method in a data processing system for efficiently multiplying operands according to claim 2 wherein said data processing system is operable in either a signed mode or an unsigned mode. and wherein each intermediate result $R_1$ through $R_4$ is calculated by adding B number of partial products $P_1$ through $P_B$ in each of said multipliers $X_1$ through $X_4$. wherein partial product $P_1$ contains the least significant bit of all partial products $P_1$ through $P_B$, and wherein said step of calculating a plurality of intermediate results. $R_1$ through $R_4$. further includes the steps of:

in response to said data processing system being operated in said signed mode. complementing most significant bits in each of said partial products $P_1$ through $P_B$ in said multiplier $X_2$ and said multiplier $X_4$;

in response to said data processing system being operated in said signed mode. complementing bits in said partial product $P_B$ in said multiplier $X_3$ and in said partial product $P_B$ in said multiplier $X_4$;

calculating. in said multiplier $X_2$. said intermediate result $R_2$ by adding $2^B$ to the sum of said partial products $P_1$ through $P_B$ having said complemented most significant bits;

calculating. in said multiplier $X_3$. said intermediate result $R_3$ by adding said partial products $P_1$ through $P_B$. wherein said partial product $P_B$ has complemented bits; and calculating. in said multiplier $X_4$. said intermediate result $R_4$ by adding said partial products $P_1$ through $P_B$. wherein said partial product $P_B$ has complemented bits and wherein each of said most significant bits in each of said partial products $P_1$ through $P_B$ have complemented bits.

5. The method in a data processing system for efficiently multiplying operands according to claim 2 wherein said data processing system is operable in a signed multiple-product mode for calculating multiple intermediate results $R_1$ through $R_4$ wherein each of said intermediate results $R_1$ through $R_4$ is equal to the product of said A-operands. $A_1$ through $A_4$. and said B-operands. $B_1$ through $B_4$. respectively. wherein $A_1$ through $A_4$ and $B_1$ through $B_4$ are signed numbers. and wherein each intermediate result $R_1$ through $R_4$ is calculated by adding B number of partial products $P_1$ through $P_B$ in each of said multipliers $X_1$ through $X_4$. wherein partial product $P_1$ contains the least significant bit of all partial products $P_1$ through $P_B$. and wherein said step of calculating a plurality of intermediate results. $R_1$ through $R_4$. further includes the steps of:

in response to said data processing system being operated in said signed multiple-product mode. complementing most significant bits in each of said partial products $P_1$ through $P_B$ in said multipliers $X_1$ through $X_4$;

in response to said data processing system being operated in said signed multiple-product mode. complementing bits in said partial product $P_B$ in said multipliers $X_1$ through $X_4$; and calculating. in said multipliers $X_1$ through $X_4$. said intermediate results $R_1$ through $R_4$ by adding $2^B$ to the sum of said partial products $P_1$ through $P_B$ having said complemented bits.

6. A data processing system for efficiently multiplying operands. wherein said data processing system includes an array of 4 B-bit multipliers. wherein said multipliers in a top row of said array are referenced as $X_1$ and $X_2$ from the right. and said multipliers in a bottom row of said array are referenced as $X_3$ and $X_4$ from the right. said data processing system comprising:

means for loading one of a plurality of A-operands. $A_1$ through $A_4$. into each of said multipliers. $X_1$ through $X_4$. respectively. in said array of 4 B-bit multipliers. wherein each of said operands $A_1$ through $A_4$ includes B number of bits;

means for loading one of a plurality of B-operands. $B_1$ through $B_4$. into each of said multipliers. $X_1$ through $X_4$. respectively. in said array of 4 B-bit multipliers. wherein each of said operands $B_1$ through $B_4$ includes B number of bits;

means for calculating a plurality of intermediate results. $R_1$ through $R_4$. wherein each of said intermediate results $R_1$ through $R_4$ is 2B bits in length and is equal to the product of said A-operand and said B-operand loaded into said multipliers $X_1$ through $X_4$;

means for outputting from said array of multipliers each of said intermediate results $R_1$ through $R_4$;

means for adding intermediate result $R_2$ and $R_3$ to produce $R_5$ which is 2B bits in length;

means for concatenating intermediate result $R_4$ and $R_1$ to produce $R_6$ which is 4B bits in length; and means for multiplying $R_5$ by $2^B$ and adding $R_6$ to produce a final result. R which is 4B bits in length.

7. The data processing system for efficiently multiplying operands according to claim 6 wherein $A_1$ and $A_3$ are equal to the least significant half of a 2B-bit data word A. $A_2$ and $A_4$ are equal to the most significant half of said 2B-bit data word A. $B_1$ and $B_2$ are equal to the least significant half of a 2B-bit data word B. $B_3$ and $B_4$ are equal to the most significant half of said 2B-bit data word B. and wherein said means for multiplying $R_5$ by $2^B$ and adding $R_6$ to produce a final result. R. includes means for multiplying $R_5$ by $2^B$ and adding $R_6$ to produce a final result. R. wherein R is equal to the product of said 2B-bit data word A and said 2B-bit data word B.

8. The data processing system for efficiently multiplying operands according to claim 6 wherein said means for multiplying $R_5$ by $2^B$ and adding $R_6$ to produce a final result. R. includes means for adding the (n)th bit of $R_5$ to the (n+B)th bit of $R_6$ to produce a final result. R.

9. The data processing system for efficiently multiplying operands according to claim 7 wherein said data processing system is operable in either a signed mode or an unsigned mode, and wherein each intermediate result $R_1$ through $R_4$ is calculated by adding B number of partial products $P_1$ through $P_B$ in each of said multipliers $X_1$ through $X_4$, wherein partial product $P_1$ contains the least significant bit of all partial products $P_1$ through $P_B$, and wherein said means for calculating a plurality of intermediate results, $R_1$ through $R_4$, further includes:

- means for complementing most significant bits in each of said partial products $P_1$ through $P_B$ in said multiplier $X_2$ and said multiplier $X_4$, in response to said data processing system being operated in said signed mode;
- means for complementing bits in said partial product $P_B$ in said multiplier $X_3$ and in said partial product $P_B$ in said multiplier $X_4$, in response to said data processing system being operated in said signed mode;
- means for calculating, in said multiplier $X_2$, said intermediate result $R_2$ by adding $2^B$ to the sum of said partial products $P_1$ through $P_B$ having said complemented most significant bits;
- means for calculating, in said multiplier $X_3$, said intermediate result $R_3$ by adding said partial products $P_1$ through $P_B$, wherein said partial product $P_B$ has complemented bits; and
- means for calculating, in said multiplier $X_4$, said intermediate result $R_4$ by adding said partial products $P_1$ through $P_B$, wherein said partial product $P_B$ has complemented bits and wherein each of said most significant bits in each of said partial products $P_1$ through $P_B$ have complemented bits.

10. The data processing system for efficiently multiplying operands according to claim 7 wherein said data processing system is operable in a signed multiple-product mode for calculating multiple intermediate results $R_1$ through $R_4$ wherein each of said intermediate results $R_1$ through $R_4$ is equal to the product of said A-operands, $A_1$ through $A_4$, and said B-operands, $B_1$ through $B_4$, respectively, wherein $A_1$ through $A_4$ and $B_1$ through $B_4$ are signed numbers, and wherein each intermediate result $R_1$ through $R_4$ is calculated by adding B number of partial products $P_1$ through $P_B$ in each of said multipliers $X_1$ through $X_4$, wherein partial product $P_1$ contains the least significant bit of all partial products $P_1$ through $P_B$, and wherein said means for calculating a plurality of intermediate results, $R_1$ through $R_4$, further includes:

- means for complementing most significant bits in each of said partial products $P_1$ through $P_B$ in said multipliers $X_1$ through $X_4$ in response to said data processing system being operated in said signed multiple-product mode;
- means for complementing bits in said partial product $P_B$ in said multipliers $X_1$ through $X_4$ in response to said data processing system being operated in said signed multiple-product mode; and
- means for calculating, in said multipliers $X_1$ through $X_4$, said intermediate results $R_1$ through $R_4$ by adding $2^B$ to the sum of said partial products $P_1$ through $P_B$ having said complemented bits.

* * * * *